US012730468B2

(12) United States Patent
Chinthu et al.

(10) Patent No.: US 12,730,468 B2
(45) Date of Patent: Sep. 8, 2026

(54) VOLTAGE REGULATOR INCLUDING A PAIR OF FEEDBACK CONTROL LOOPS FOR DRIVE TRANSISTOR CONTROL

(71) Applicant: GlobalFoundries U.S. Inc., Malta, NY (US)

(72) Inventors: Siva Kumar Chinthu, Bangalore (IN); Suresh Pasupula, Andhra Pradesh (IN); Rakesh Chandrakant Pednekar, Bangalore (IN); Teja Manjunath, Bangalore (IN)

(73) Assignee: GlobalFoundries U.S. Inc., Malta, NY (US)

( * ) Notice: Subject to any disclaimer, the term of this patent is extended or adjusted under 35 U.S.C. 154(b) by 197 days.

(21) Appl. No.: 18/614,875

(22) Filed: Mar. 25, 2024

(65) Prior Publication Data

US 2025/0298428 A1 Sep. 25, 2025

(51) Int. Cl.
*G05F 1/575* (2006.01)
*G05F 1/563* (2006.01)

(52) U.S. Cl.
CPC .............. *G05F 1/575* (2013.01); *G05F 1/563* (2013.01)

(58) Field of Classification Search
CPC . G05F 1/575; G05F 1/56; G05F 1/565; G05F 1/563
See application file for complete search history.

(56) References Cited

U.S. PATENT DOCUMENTS 6,040,716 A * 3/2000 Bosshart ............ H03K 19/0963 326/97
7,619,402 B1 * 11/2009 Kwong ................... G05F 1/575 323/369

(Continued)

FOREIGN PATENT DOCUMENTS

CN 116185124 A * 5/2023 ............... G05F 3/26

OTHER PUBLICATIONS

Sánchez-Sinencio, "Low Drop-Out (LDO) Linear Regulators: Design Considerations and Trends for High Power-Supply Rejection (PSR)," IEEE Santa Clara Valley (SCV) Solid State Circuits Society, Feb. 11, 2010, 47 pages.

(Continued)

*Primary Examiner* — Ryan Johnson
(74) *Attorney, Agent, or Firm* — Ramakrishnan Parthasarathy; Hoffman Warnick LLC

(57) ABSTRACT

A low drop-out voltage regulator (LDO) circuit structure includes a drive transistor with first connected to an input voltage node, a second terminal connected to an output voltage node and a voltage divider, and a third terminal (i.e., a control terminal). The structure employs a pair of concurrently operating feedback control loops between a feedback voltage node of the voltage divider and the control terminal to continuously adjust a control voltage applied to the control terminal and thereby reduce ripple of an output voltage (Vout) at the output voltage node. A first feedback control loop includes comparator and a push capacitor connected between the feedback voltage node and the con- (Continued)

trol terminal. The second feedback control loop includes an operational amplifier connected between the feedback voltage node and the control terminal. The first feedback control loop operates a faster speed than the second to quickly initiate the necessary control voltage adjustments.

17 Claims, 3 Drawing Sheets

(56) References Cited

U.S. PATENT DOCUMENTS

| | | | | |
|---|---|---|---|---|
| 9,134,743 | B2 | 9/2015 | Bisson et al. | |
| 9,946,281 | B1 | 4/2018 | Huang et al. | |
| 11,599,133 | B2 | 3/2023 | Saha | |
| 11,625,057 | B2 | 4/2023 | Matsuo | |
| 2011/0121802 | A1* | 5/2011 | Zhu | G05F 1/575 323/281 |
| 2022/0137655 | A1* | 5/2022 | Ray | G05F 1/565 323/282 |
| 2022/0137656 | A1* | 5/2022 | Vangara | G05F 1/565 323/280 |

OTHER PUBLICATIONS

Maji et al., "Digital LDO with Time-Interleaved Comparators for Fast Response and Low Ripple," 2016 IEEE Computer Society Annual Symposium on VLSI, downloaded from IEEE Xplore on Jan. 27, 2024, pp. 337-342.

Okuma et al., "0.5-V Input Digital LDO with 0.5-V Input Digital LDO with 98.7% Current Efficiency and 2.7-µA Quiescent Current in 65nm CMOS," 2010 IEEE, Downloaded from IEEE Xplore on Jan. 27, 2024, 4 pages.

* cited by examiner

VOLTAGE REGULATOR INCLUDING A PAIR OF FEEDBACK CONTROL LOOPS FOR DRIVE TRANSISTOR CONTROL

BACKGROUND

The present disclosure relates to voltage regulators and, more particularly, to embodiments of a low drop-out voltage regulator (LDO).

An LDO is a circuit structure designed to maintain a relatively constant output voltage (Vout) regardless of fluctuations in load conditions. Typically, an LDO includes a drive transistor for generating Vout at an output terminal and a single feedback control loop including an operational amplifier connected to the gate of the drive transistor. In operation, the output of the operational amplifier changes in response to fluctuations in Vout, which are caused by fluctuations in a current load (IL) connected to the output terminal. As the output of the operational amplifier changes, the conductivity of the drive transistor changes so Vout is continuously pulled toward some desired level. In such an LDO, ripple of Vout may be significant. Ripple refers to periodic variation exhibited by a DC voltage and this variation can impair performance of devices connected to receive Vout. Typically, Vout ripple is reduced by increasing the capacitance load (CL) connected to the output of the LDO. However, adding capacitance can significantly increase circuit area.

SUMMARY

Disclosed herein are embodiments of a voltage regulator structure and, particularly, a low drop-out voltage regulator (LDO) circuit structure. The LDO circuit structure can include a transistor and a voltage divider. The transistor can include: a first terminal, which is connected to receive an input voltage node; a second terminal, which is connected to an output voltage node; and a third terminal and, more particularly, a control terminal. The voltage divider can be connected between the second terminal and a ground voltage rail and can include a feedback voltage node. The LDO circuit structure can further include: a first feedback control loop, which is connected between the feedback voltage node and the third terminal; and a second feedback control loop, which is connected between the feedback voltage node and the third terminal and which is different from the first feedback control loop.

Some embodiments of an LDO circuit structure disclosed herein can include a P-type field effect transistor (PFET) and a voltage divider. The PFET can include: a gate; a source region connected to an input voltage node; and a drain region connected to an output voltage node. The voltage divider can be connected between the drain region and a ground voltage rail and can include a feedback voltage node. The LDO circuit structure can further include a first feedback control loop and a second feedback control loop. The first feedback control loop can include a comparator and a capacitor connected between the feedback voltage node and the gate. The second feedback control loop can include an operational amplifier connected between the feedback voltage node and the gate.

Other embodiments of the LDO circuit structure disclosed herein can similarly include a PFET and a voltage divider. The PFET can include: a gate; a source region connected to an input voltage node; and a drain region connected to an output voltage node. The voltage divider can be connected between the drain region and a ground voltage rail and can include a feedback voltage node. The LDO circuit structure can further include a first feedback control loop and a second feedback control loop. The first feedback control loop can include a comparator and a capacitor connected between the feedback voltage node and the gate. The second feedback control loop can include an operational amplifier connected between the feedback voltage node and the gate. The LDO circuit structure can further include a current load connected to the output voltage node. This current load can be variable and the two feedback control loops can cause changes in conductivity of the PFET in response to variations in the current load in order to reduce ripple of an output voltage at the output voltage node. The first feedback control loop can specifically initiate such changes faster than second feedback control loop.

It should be noted that all aspects, examples, and features of disclosed embodiments mentioned in the summary above can be combined in any technically possible way. That is, two or more aspects of any of the disclosed embodiments, including those described in this summary section, may be combined to form implementations not specifically described herein. The details of one or more implementations are set forth in the accompanying drawings and the description below. Other features, objects and advantages will be apparent from the description and drawings, and from the claims.

BRIEF DESCRIPTION OF THE DRAWINGS

The present disclosure will be better understood from the following detailed description with reference to the drawings, which are not necessarily drawn to scale and in which.

DETAILED DESCRIPTION

Figure 1:
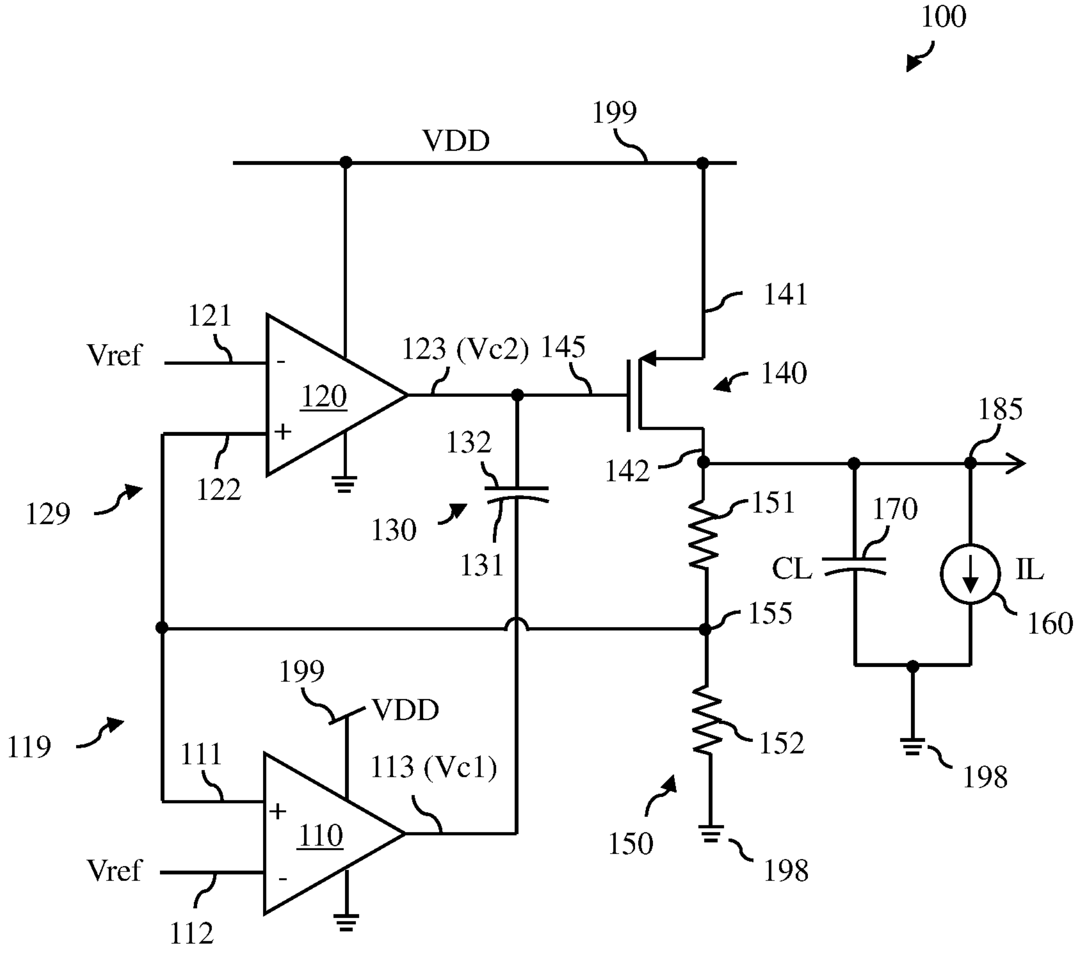
FIG. 1 is a schematic diagram illustrating an LDO circuit structure.

An LDO is a circuit structure designed to maintain a relatively constant output voltage (Vout) regardless of fluctuations in load conditions. Typically, an LDO includes a drive transistor for generating Vout at an output terminal and a single feedback control loop including an operational amplifier connected to the gate of the drive transistor. In operation, the output of the operational amplifier changes in response to fluctuations in Vout, which are caused by fluctuations in a current load (IL) connected to the output terminal. As the output of the operational amplifier changes, the conductivity of the drive transistor changes so Vout is continuously pulled toward some desired level. In such an LDO, ripple of Vout may be significant. Ripple refers to periodic variation exhibited by a DC voltage and this variation can impair performance of devices connected to receive Vout. Typically, Vout ripple is reduced by increasing the capacitance load (CL) connected to the output of the LDO. However, adding capacitance can significantly increase circuit area. Other circuit structures have been developed to reduce ripple of Vout ripple without adding as much CL. Unfortunately, these other circuit structures can be rather complex, can require different load currents, load capacitances and/or load frequencies, and can lead to higher settling times (Ts) and lower Vout levels.

In view of the foregoing, disclosed herein are embodiments of a compact low drop-out voltage regulator (LDO)

circuit structure that generates an output voltage (Vout) at a desired voltage level (e.g., ~1.4 volts (V)) with low ripple (e.g., with ripple less than 5.0 millivolts (mV)). The LDO circuit structure can include a drive transistor. This drive transistor can include first and second terminals, which are connected to input and output voltage nodes, respectively. The drive transistor can also have a third terminal and, particularly, a control terminal. The LDO circuit structure can further include a voltage divider connected to the second terminal. For example, the transistor could be a field effect transistor where the first and second terminals are source/drain regions and the third terminal is a gate. As with prior art LDO circuit structures, this LDO circuit structure employs feedback-based control of the transistor to continuously pull Vout at the output voltage node toward a desired Vout level even in the presence of current load (IL) variations at the output voltage node. However, instead of employing only a single feedback control loop with an operational amplifier between a feedback voltage node in the voltage divider and the control terminal, this LDO circuit structure employs a pair of concurrently operating first and second feedback control loops. For example, the first feedback control loop can include a comparator and a push capacitor connected between the feedback voltage node and the control terminal. The second feedback control loop can include an operational amplifier between the feedback voltage node and the control terminal. In this case, the first feedback control loop can operate at a faster speed than the second to quickly initiate changes required in the voltage applied to the control terminal to compensate for changes in Vout caused by IL variations in order to reduce Vout ripple. Furthermore, with this configuration, Vout ripple is significantly reduced (e.g., to less than 5.0 mV) without significantly increasing circuit area, increasing settling time (Ts), or changing the desired Vout level (e.g., of ~11.4V) as compared to circuit area, Ts and Vout in a conventional LDO circuit structure that employs only a single feedback control loop.

More particularly, FIG. 1 is a schematic diagram illustrating embodiments of an LDO circuit structure 100. LDO circuit structure 100 can include a drive transistor 140. Drive transistor 140 can include a first terminal 141, which is electrically connected to an input voltage node 199 to receive an input voltage (Vin) (e.g., equal to a positive supply voltage (VDD)), and a second terminal 142, which is electrically connected to an output voltage node 185. Drive transistor 140 can further include a third terminal 145 and, more particularly, a control terminal, which is electrically connected to a pair of concurrently operating first and second feedback control loops 119 and 129, as discussed in greater detail below. Those skilled in the art will recognize that conductivity of a drive transistor 140 and, thereby, current flow between first and second terminals 141-142 will depend upon a control voltage applied to control terminal 145 via first and second feedback control loops 119 and 129. Furthermore, by increasing conductivity of drive transistor 140, an output voltage (Vout) at output voltage node 185 will increase and vice versa.

Drive transistor 140 is shown in FIG. 1 as being a P-type transistor and, particularly, a p-type field effect transistor (PFET). In a PFET, first terminal 141 can be a source region, second terminal 142 can be a drain region, and third terminal 145 (i.e., the control terminal) can be a gate. Additionally, a channel region can be positioned between the source/drain regions with the gate positioned adjacent to the channel region. The source and drain regions can have P-type conductivity at a relatively high conductivity level (e.g., they can be P+ source/drain regions). The channel region can have N-type conductivity at a relatively low conductivity level (e.g., it can be an N-channel region). Alternatively, the channel region can be undoped (e.g., it can be an intrinsic channel region). Those skilled in the art will recognize that conductivity of PFET and, thereby, current flow between the source and drain regions (i.e., between first and second terminals 141-142) will increase as the control voltage applied to the gate (i.e., control terminal 145) via first and second feedback control loops 119 and 129 decreases (i.e., drops toward 0.0V). Furthermore, the conductivity of PFET and, thereby, current flow between the source and drain regions (i.e., between first and second terminals 141-142) will decrease as the control voltage applied to the gate (i.e., control terminal 145) via first and second feedback control loops 119 and 129 increases (i.e., rises toward VDD).

It should be understood that FIG. 1 is provided for illustration purposes and is not intended to be limiting. For example, alternatively, drive transistor 140 could be a different P-type transistor such as a PNP-type bipolar junction transistor (BJT) or heterojunction bipolar transistor (HBT). In the case of a PNP-type BJT or HBT, the first and second terminals 141-142 can be emitter and collector regions, respectively, and the third terminal 145 (i.e., the control terminal) can be a base region. Those skilled in the art will recognize that the conductivity of PNP-type BJT or HBT and, thereby, current flow between the emitter and collector regions (i.e., between first and second terminals 141-142) will increase as the control voltage applied to the base (i.e., control terminal 145) via first and second feedback control loops 119 and 129 decreases (i.e., drops toward 0.0V) and vice versa.

LDO circuit structure 100 could be implemented using any one of various different technology processing platforms and drive transistor 140 could be a P-type transistor (e.g., a PFET or a PNP-type BJT or HBT) available in that technology processing platform. For example, depending upon the technology processing platform within which LDO circuit structure 100 is implemented, a PFET drive transistor could be a planar device or a non-planar device, could include a single gate adjacent to the channel region or multiple gates adjacent to the channel region, etc. Similarly, depending upon the technology processing platform within which LDO circuit structure 100 is implemented, a PNP-type BJT and HBT drive transistor could be horizontally oriented device, a vertically oriented device, etc. Such PFETs and PNP-type BJTs or HBTs are well known in the art and, thus, the details thereof have been omitted from this specification in order to allow the reader to focus on the salient aspects of the disclosed embodiments (e.g., related to structures of first feedback control loop 119 and second feedback control loop 129 as a whole and concurrent operation of the first and second feedback control loops to control drive transistor 140). In any case, drive transistor 140 can, for example, have maximum voltage ratings that are no less than VDD. For example, in the case of a PFET drive transistor (as illustrated), the maximum gate-source voltage (VGSmax) rating, the maximum gate-drain voltage (VGDmax) rating, and the maximum gate-drain voltage (VGD) rating can all be at or above VDD. For example, if VDD is 1.8V, maximum voltage ratings of drive transistor 140 can be at or above 1.8V. If VDD is 1.5V, maximum voltage ratings of drive transistor 140 can be at or above 1.5V and so on.

Optionally, LDO circuit structure 100 can include a capacitive load (CL) 170, which is electrically connected to output voltage node 185. Those skilled in the art will recognize that such a CL can be added to reduced ripple of Vout at output voltage node 185. Optionally, LDO circuit structure 100 can also include a resistive load (RL) (not shown), which is electrically connected to output voltage node 185 for driving current. While RL improves drive current, it may result in a slight reduction in Vout at output voltage node 185 (e.g., by 0.6V).

In LDO circuit structure 100, output voltage node 185 can further be electrically connected to a current load (IL) 160. Those skilled in the art will recognize that IL refers to the amount of electrical current passing from a power supply to a device or component receiving power. IL 160 can be variable and in some embodiments can be periodic. That is, depending upon the application, IL could periodically switch between a minimum current amount (IL-min) and a maximum current amount (IL-max). For example, IL could periodically switch between an IL-min of 0.0 milliamps (mA) and an IL-max of 5 mA. As mentioned above, variations in IL 160 can cause corresponding variations in Vout (i.e., causes Vout ripple). Specifically, as IL drops Vout rises and vice versa.

In order to reduce Vout ripple and, particularly, to reduce the amount by which Vout drops as IL rises and the amount by which Vout rises as IL drops, LDO circuit structure 100 employs feedback-based control of drive transistor 140 to continuously pull Vout at output voltage node 185 toward the desired Vout level (e.g., 1.4V). However, instead of employing only a single feedback control loop with an operational amplifier between a feedback voltage node in the voltage divider and control terminal 145 of drive transistor 140, this LDO circuit structure 100 employs a pair of concurrently operating, but differently structured, first and second feedback control loops 119 and 129. Specifically, first feedback control loop 119 and second feedback control loop 129 are both configured to cause changes in conductivity of drive transistor 140 in response to variations in IL to reduce Vout ripple with first feedback control loop 119 being configured differently from second feedback control loop 129 so as to initiate these changes faster than second feedback control loop 129.

More particularly, LDO circuit structure 100 can further include a voltage divider 150, which is connected between second terminal 142 and a ground voltage rail 198. Voltage divider 150 can, for example, include a first resistor 151 and a second resistor 152. First resistor 151 can have opposite end terminal electrically connected to second terminal 142 of drive transistor 140 and a feedback voltage node 155, respectively. Second resistor 152 can have opposite end terminals electrically connected to feedback voltage node 155 and ground voltage rail 198. In some embodiment, first and second resistances (R1 and R2) of first and second resistors 151-152, respectively, could be essentially equal. In other embodiments, first resistor 151 could have a first resistance (R1) and second resistor 152 could have a second resistance (R2) that is smaller than R1. For example, R2 could be equal to 2/3*R1. For example, if first resistor 151 has a first resistance of eight kiloohms (kΩ), then second resistor 152 can have a second resistance of 6 kΩ. Alternatively, R2 could be equal to some other ratio of R1.

Those skilled in the art will recognize that with such a voltage divider 150, a feedback voltage (Vfb) at feedback voltage node 155 can be determined based on the voltage level on second terminal 142 (which is equal to Vout on output voltage node 185), R1 and R2, as follows:

$$Vfb = Vout * R2/(R1 + R2).$$

Thus, consider, for example, a voltage divider 150 where R1 is 8 kΩ and R2 is 6 kΩ and an LDO circuit structure where the desired Vout is 1.4V. If Vout is 1.4V, then Vfb=1.4*6/(6+8) or 0.6V. If Vout rises above 1.4V, Vfb will rise above 0.6V. If Vout drops below 1.4V, Vfb will drop below 0.6V.

Both first feedback control loop 119 and second feedback control loop 129 can be electrically connected between feedback voltage node 155 of voltage divider 150 and third terminal 145 (i.e., the control terminal) of drive transistor 140.

Figure 2:
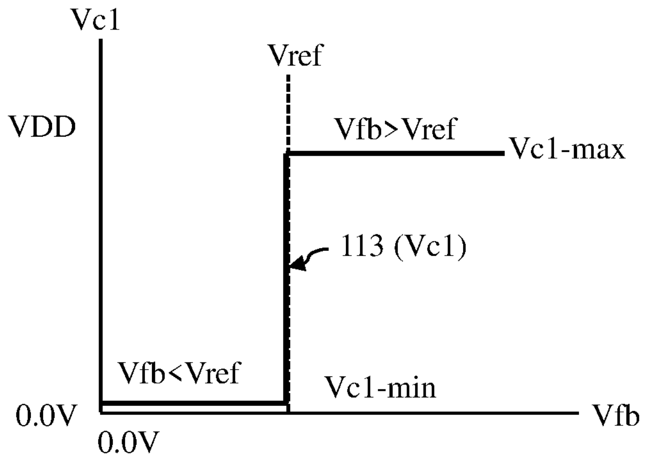
FIGS. 2 and 3 are graphs illustrating operation of the comparator and operational amplifier, respectively.

First feedback control loop 119 can include a comparator 110. Comparator 110 can have a first inverting input 112, which is electrically connected to receive a reference voltage (Vref). Comparator 110 can further have a first non-inverting input 111, which is electrically connected to feedback voltage node 155 for receiving Vfb. Comparator 110 can further be configured to compare Vfb to Vref and, based on results of the comparison, to generate a digital control voltage (Vc1) at output 113 that indicates whether Vfb is greater than or less than Vref. Specifically, as illustrated in the graph of FIG. 2, Vc1 can be at a high voltage level (Vc1-max) and, particularly, at a logic 1 voltage level when Vfb is greater than Vref. Contrarily, Vc1 can switch to a low voltage level (Vc1-min) and, particularly, at a logic 0 voltage level when Vfb drops below Vfb. Various comparator structures are well known in the art and, thus, the details thereof have been omitted from the specification in order to allow the readers to focus on the salient aspects of the disclosed embodiments (e.g., related to structures of first feedback control loop 119 and second feedback control loop 129 as a whole and concurrent operation of the two feedback control loops to control drive transistor 140). The power supplies electrically connected to comparator 110 can be at VDD, which is the same Vin on first terminal 141 of drive transistor 140 (e.g., 1.8V), and at ground (e.g., 0.0V). In this case, Vc1-min can be at approximately 0.0V (e.g., 50 mV) and Vc1-max can be at approximately VDD with some voltage loss (e.g., 1.65V).

First feedback control loop 119 can further include a capacitor 130 (also referred to herein as a push capacitor). Capacitor 130 can have a first capacitor plate 131, a second capacitor plate 132, and a capacitor dielectric between the first capacitor plate 131 and the second capacitor plate 132. First capacitor plate 131 can be electrically connected to output 113 of comparator 110 in order to receive Vc1. Second capacitor plate 132 can be electrically connected to third terminal 145. Capacitor 130 can be a relatively small capacitor (e.g., a capacitor with a capacitance of less than 1 picofarads (pF), such as a capacitance of 0.5 (pF)). Capacitor 130 can further be charged or discharge depending upon Vc1. That is, when Vc1 output from comparator 110 switches to Vc1-max (because Vfb has risen above Vref), capacitor 130 is charged, thereby providing a relatively quick but small positive voltage boost to third terminal 145 of drive transistor 140. Contrarily, when Vc1 is at Vc1-min, capacitor 130 is discharged, thereby quickly removing any voltage boost.

Second feedback control loop 119 can include an operational amplifier (op-amp) 120 (which is a larger device than comparator 110). Op-amp 120 can have a second inverting input 122, which is electrically connected to receive Vref.

Figure 3:
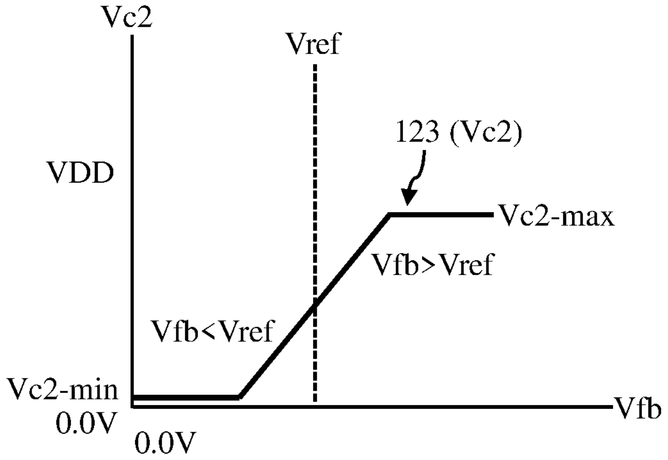

Op-amp 120 can further have a second non-inverting input 121, which is electrically connected to feedback voltage node 155 for receiving Vfb. Op-amp 120 can further be configured to compare Vfb to Vref and, based on results of the comparison, to generate an analog control voltage (Vc2) at output 123. As illustrated in the graph of FIG. 3, as Vfb rises and falls, Vc2 will rise and fall linearly until minimum and maximum saturation voltages are reached. That is, as Vfb rises to Vref and above, Vc2 will continue to rise linearly until a maximum saturation voltage (Vc2-max) (e.g., 1.51V) is reached. Then, Vc2 will stay steady at Vc2-max regardless of further increases in Vfb. Similarly, as Vfb drops below Vref and lower, Vc2 will continue to drop linearly until a minimum saturation voltage (Vc2-min) (e.g., 0.54V) is reached. Then, Vc2 will stay steady at Vc2-min regardless of further drops in Vfb. The power supplies electrically connected to op-amp 120 can be the same as the power supplies connected to comparator 110 (e.g., at VDD and ground). In this second feedback control loop, third terminal 145 of drive transistor 140 can be electrically connected to output 123 of op-amp 120 so as to receive Vc2. Various op-amp structures are well known in the art and, thus, the details thereof have been omitted from the specification in order to allow the readers to focus on the salient aspects of the disclosed embodiments (e.g., related to structures of first feedback control loop 119 and second feedback control loop 129 as a whole and concurrent operation of the two feedback control loops to control drive transistor 140).

In these feedback control loops 119 and 129, comparator 110 can be a faster device (i.e., can have a faster switching speed) than op-amp 120. That is, output of comparator 110 can switch faster between Vc1-min and Vc1-max than output of op-amp 120 can switch between Vc2-min and Vc2-max. During concurrent operation of the first and second feedback control loops 119 and 129, comparator 110 and op-amp 120 each concurrently receive Vref and Vfb at their respective inverting and non-inverting inputs. If Vfb has risen above Vref, digital control voltage (Vc1) at output 113 of comparator 110 will quickly go high, charging capacitor 130 and providing a voltage boost to third terminal 145 of drive transistor 140 and initiating at least a small drop in the conductivity of drive transistor 140. Additionally, depending upon the actual difference between Vfb and Vref, analog control voltage (Vc2) from op-amp 120 and applied to third terminal 145 of drive transistor 140 will continue to rise linearly (until Vc2-max is reached) further reducing the conductivity of drive transistor 140 as necessary to pull Vout back down to the desired Vout level. Contrarily, if Vfb has dropped below Vref, digital control voltage (Vc1) at output 113 of comparator 110 will quickly go low, discharging capacitor 130 and removing the voltage boost on third terminal 145 of drive transistor 140 and initiating at least a small increase in the conductivity of drive transistor 140. Additionally, depending upon the actual difference between Vfb and Vref, analog control voltage (Vc2) from op-amp 120 and applied to third terminal 145 of drive transistor 140 will continue to drop linearly (until Vc2-min is reached) further increasing the conductivity of drive transistor 140 as necessary to pull Vout back up to the desired Vout level.

Figure 4:
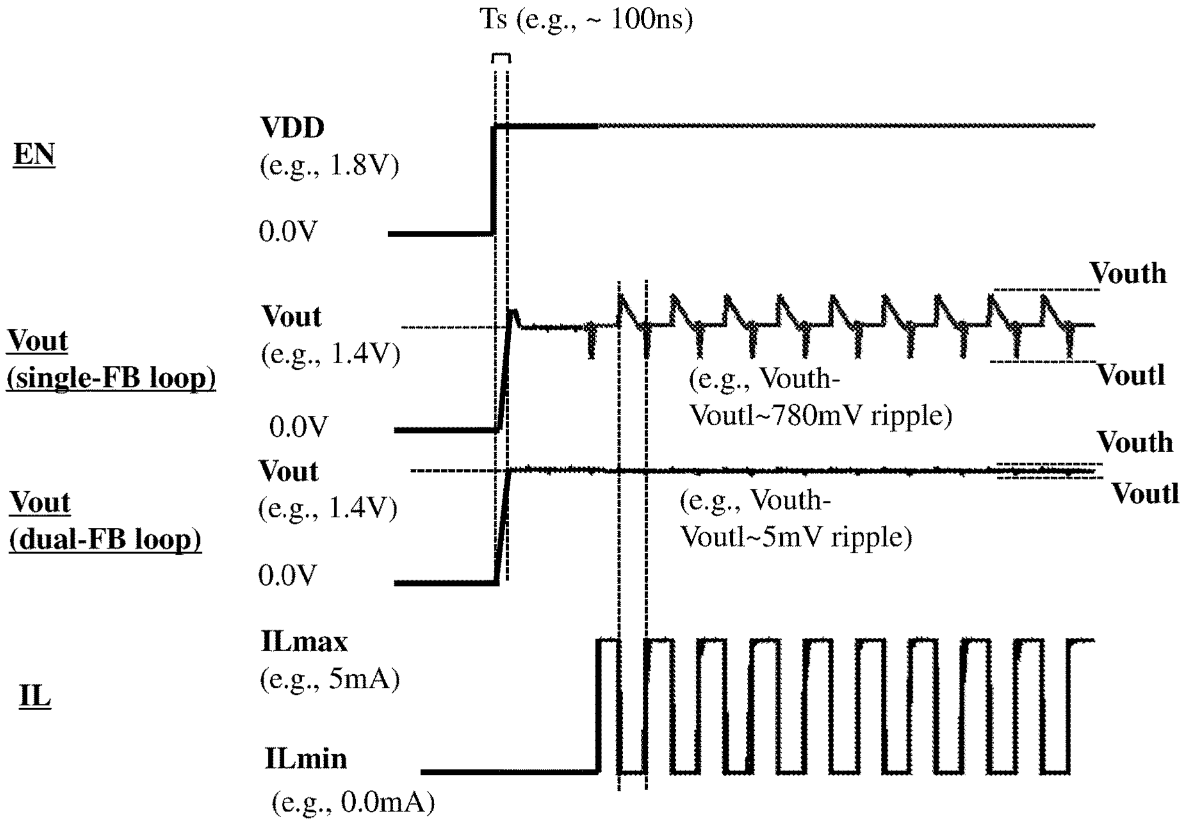
FIG. 4 is a graph comparing various LDO circuit structure waveforms.

FIG. 4 is a graph comparing various LDO circuit structure waveforms. One waveform shows periodic changes in IL at the output voltage node of an LDO circuit structure over time. Another waveform illustrates Vout and, the ripple thereof, exhibited by a conventional LDO circuit structure that includes a CL (e.g., of 30 pF) and only a single feedback control loop to reduce ripple. Another waveform illustrates Vout, and the ripple thereof, exhibited by the disclosed LDO circuit structure 100 that includes the same CL (e.g., of 30 pF) and first and second feedback control loops 119 and 129 to reduce ripple. As illustrated, Vout ripple exhibited by the disclosed LDO circuit structure is significantly reduced (e.g., from approximately 780 mV in the prior art LDO circuit structure to approximately 5 mV in the disclosed LDO circuit structure 100). Furthermore, this reduction in ripple is achieved without significantly changing or increasing the setting time (Ts) (e.g., of approximately 100 nanoseconds (ns)), the overall amount of area consumed by the LDO circuit structure (e.g., 0.003014 $mm^2$ as compared to 0.00302 $mm^2$) or the operating frequency (e.g., of 1 MHz to 10 MHz).

It should be noted that, during design, the size of the capacitive load (CL) can be selected to achieve a desired balance between the amount of output voltage ripple and the overall size of the circuit (which increases or decreases as a function of the load capacitance). For example, if some amount of ripple greater than 5 mV is acceptable, CL and thereby the size of the LDO circuit structure 100 could be reduced.

Additionally, it should be understood that the embodiments described above and illustrated in the figures are not intended to be limiting. For example, in the embodiments described above and illustrated in the figures, drive transistor 140 is described as being a P-type transistor (e.g., a PFET or a PNP-type BJT or HBT). In these embodiments, comparator 110 and op-amp 120 have inverting inputs that receive Vref and non-inverting inputs that receive Vfb. Alternatively, drive transistor 140 could be an N-type transistor (e.g., an N-type field effect transistor (NFET) or an NPN-type BJT or HBT). In this case, the inverting and non-inverting inputs of comparator 110 and op-amp 120 could be swapped to achieve the necessary adjustments to drive transistor conductivity and thereby to Vout.

In the method and structures described above, a semiconductor material refers to a material whose conducting properties can be altered by doping with an impurity. Exemplary semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped with a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region.

It should be understood that the terminology used herein is for the purpose of describing the disclosed structures and methods and is not intended to be limiting. For example, as used herein, the singular forms “a,” “an,” and “the” are intended to include the plural forms as well, unless the context clearly indicates otherwise. Additionally, as used herein, the terms “comprises,” “comprising,” “includes,” and/or “including” specify the presence of stated features, integers, steps, operations, elements, and/or components, but do not preclude the presence or addition of one or more other features, integers, steps, operations, elements, components, and/or groups thereof. Furthermore, as used herein, terms such as “right,” “left,” “vertical,” “horizontal,” “top,” “bottom,” “upper,” “lower,” “under,” “below,” “underlying,” “over,” “overlying,” “parallel,” “perpendicular,” etc., are intended to describe relative locations as they are oriented and illustrated in the drawings (unless otherwise indicated) and terms such as “touching,” “in direct contact,” “abutting,” “directly adjacent to,” “immediately adjacent to,” etc., are intended to indicate that at least one element physically contacts another element (without other elements separating the described elements). The term “laterally” is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various disclosed embodiments have been presented for purposes of illustration but are not intended to be exhaustive or limiting. Many modifications and variations will be apparent to those of ordinary skill in the art without departing from the scope and spirit of the disclosed embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:

a transistor including: a first terminal connected to receive an input voltage node; a second terminal connected to an output voltage node; and a third terminal, wherein the third terminal is a control terminal;

a voltage divider connected between the second terminal and a ground voltage rail, wherein the voltage divider includes a feedback voltage node;

a first feedback control loop connected between the feedback voltage node and the third terminal, wherein the first feedback control loop includes a comparator and wherein the comparator includes first inputs connected to receive a feedback voltage from the feedback voltage node and a reference voltage; and a second feedback control loop connected between the feedback voltage node and the third terminal, wherein the second feedback control loop includes an operational amplifier, wherein the operational amplifier includes second inputs connected to receive the feedback voltage and the reference voltage, and wherein the comparator further includes a first output and wherein the first feedback control loop further includes a capacitor having a first capacitor plate connected to the first output to receive a digital control voltage from the comparator and further having a second capacitor plate connected to the third terminal.

2. The structure of claim 1, wherein the operational amplifier further includes a second output, and wherein the third terminal is connected to the second output to receive an analog control voltage from the operational amplifier.

3. The structure of claim 1, wherein the voltage divider includes: a first resistor connected between the second terminal and the feedback voltage node; and a second resistor connected between the feedback voltage node and the ground voltage rail.

4. The structure of claim 3, wherein the first resistor has a first resistance and the second resistor has a second resistance that is smaller than the first resistance.

5. The structure of claim 1, further comprising a capacitive load connected to the output voltage node.

6. The structure of claim 1, further comprising a current load connected to the output voltage node, wherein the current load is variable, wherein the first feedback control loop and the second feedback control loop cause changes in conductivity of the transistor in response to variations in the current load to reduce ripple of an output voltage at the output voltage node, and wherein the first feedback control loop initiates the changes in the conductivity of the transistor faster than the second feedback control loop.

7. A structure comprising:

a P-type field effect transistor (PFET) including: a gate; a source region connected to an input voltage node; and a drain region connected to an output voltage node;

a voltage divider connected between the drain region and a ground voltage rail, wherein the voltage divider includes a feedback voltage node;

a first feedback control loop including a comparator and a capacitor, wherein the comparator includes: first inputs connected to receive a feedback voltage from the feedback voltage node and a reference voltage; and a first output, and wherein the capacitor is connected between the first output and the gate; and a second feedback control loop including an operational amplifier, wherein the operational amplifier includes second inputs connected to receive the feedback voltage and the reference voltage and a second output to the gate, wherein the first inputs include a first inverting input connected to receive the reference voltage and a first non-inverting input connected to receive the feedback voltage, wherein the comparator outputs a digital control voltage, wherein, when the feedback voltage is less than the reference voltage, the digital control voltage is at a logic 0 voltage level, wherein, when the feedback voltage is greater than the reference voltage, the digital control voltage is at a logic 1 voltage level, and wherein the capacitor has a first capacitor plate connected to the first output to receive the digital control voltage from the comparator and a second capacitor plate connected to the gate.

8. The structure of claim 7, wherein the second inputs include a second inverting input connected to receive the reference voltage and a second non-inverting input connected to receive the feedback voltage, wherein the operational amplifier outputs an analog control voltage from the second output to the gate, wherein, when the feedback voltage drops below the reference voltage, the analog control voltage decreases to increase conductivity of the PFET and to increase an output voltage at the output voltage node, and wherein, when the feedback voltage rises above the reference voltage, the analog control voltage increases to decrease the conductivity of the PFET and to decrease the output voltage at the output voltage node.

9. The structure of claim 7, wherein the comparator has a faster switching speed than the operational amplifier.

10. The structure of claim 7, wherein the voltage divider includes: a first resistor connected between the drain region and the feedback voltage node; and a second resistor connected between the feedback voltage node and the ground voltage rail.

11. The structure of claim 10, wherein the first resistor has a first resistance and the second resistor has a second resistance that is smaller than the first resistance.

12. The structure of claim 7, further comprising a capacitive load connected to the output voltage node.

13. The structure of claim 7, further comprising a current load connected to the output voltage node, wherein the current load is variable, wherein the first feedback control loop and the second feedback control loop cause changes in conductivity of the PFET in response to variations in the current load to reduce ripple of an output voltage at the output voltage node, and wherein the first feedback control loop initiates the changes in the conductivity of the PFET faster than the second feedback control loop.

14. A structure comprising:

a P-type field effect transistor (PFET) including: a gate; a source region connected to an input voltage node; and a drain region connected to an output voltage node;

a voltage divider connected between the drain region and a ground voltage rail, wherein the voltage divider includes a feedback voltage node;

a first feedback control loop including a comparator and a capacitor, wherein the comparator includes: first inputs connected to receive a feedback voltage from the feedback voltage node and a reference voltage; and a first output, and wherein the capacitor is connected between the first output and the gate;

a second feedback control loop including an operational amplifier, wherein the operational amplifier includes: second inputs connected to receive the feedback voltage and the reference voltage and a second output connected to the gate; and a current load connected to the output voltage node, wherein the current load is variable, wherein the first feedback control loop and the second feedback control loop cause changes in conductivity of the PFET in response to variations in the current load to reduce ripple of an output voltage at the output voltage node, and wherein the first feedback control loop initiates the changes in the conductivity of the PFET faster than the second feedback control loop, wherein the first inputs include a first inverting input connected to receive the reference voltage and a first non-inverting input connected to receive the feedback voltage, wherein the comparator outputs a digital control voltage, wherein, when the feedback voltage is less than the reference voltage, the digital control voltage is at a logic 0 voltage level, wherein, when the feedback voltage is greater than the reference voltage, the digital control voltage is at a logic 1 voltage level, and wherein the capacitor has a first capacitor plate connected to the first output to receive the digital control voltage from the comparator and a second capacitor plate connected to the gate.

15. The structure of claim 14, wherein the second inputs include a second inverting input connected to receive the reference voltage and a second non-inverting input connected to receive the feedback voltage, wherein the operational amplifier outputs an analog control voltage from the second output to the gate, wherein, when the feedback voltage drops below the reference voltage, the analog control voltage decreases to increase the conductivity of the PFET and to increase the output voltage at the output voltage node, and wherein, when the feedback voltage rises above the reference voltage, the analog control voltage rises to decrease the conductivity of the PFET and to decrease the output voltage at the output voltage node.

16. The structure of claim 14, wherein the comparator has a faster switching speed than the operational amplifier.

17. The structure of claim 14, wherein the voltage divider includes: a first resistor connected between the drain region and the feedback voltage node; and a second resistor connected between the feedback voltage node and the ground voltage rail.

* * * * *